(12) United States Patent
Beyer

(10) Patent No.: US 8,413,126 B2
(45) Date of Patent: Apr. 2, 2013

(54) SCALAR CODE REDUCTION USING SHORTEST PATH ROUTING

(75) Inventor: James C. Beyer, Mendota Heights, MN (US)

(73) Assignee: Cray Inc., Seattle, WA (US)

( * ) Notice: Subject to any disclaimer, the term of this patent is extended or adjusted under 35 U.S.C. 154(b) by 1664 days.

(21) Appl. No.: 11/763,990

(22) Filed: Jun. 15, 2007

(65) Prior Publication Data
US 2008/0313621 A1    Dec. 18, 2008

(51) Int. Cl.
*G06F 9/45* (2006.01)
(52) U.S. Cl. ............... 717/152; 717/158; 717/154
(58) Field of Classification Search ............ 717/152, 717/158, 154
See application file for complete search history.

(56) References Cited

U.S. PATENT DOCUMENTS

| | | | | |
|---|---|---|---|---|
| 6,074,433 | A | * | 6/2000 | Haraguchi et al. ............ 717/160 |
| 6,523,173 | B1 | * | 2/2003 | Bergner et al. ............... 717/152 |
| 6,745,384 | B1 | * | 6/2004 | Biggerstaff .................. 717/156 |

OTHER PUBLICATIONS

Chamski, Z. "Nested Loop Sequences: Towards Efficient Loop Structures in Automatic Parallelization" 1994, IEEE, p. 14-22.*

* cited by examiner

*Primary Examiner* — Qamrun Nahar
(74) *Attorney, Agent, or Firm* — Perkins Coie LLP

(57) ABSTRACT

This document discusses, among other things, a system and method computing the shortest path expression in a loop having a plurality of expressions. Candidate expressions in the loop are identified and partitioned into sets. A cost matrix is computed as a function of the sets. Paths are found through the cost matrix and, if there are cycles in the paths, the cycles are broken. One or more shortest path expressions are generated as a function of the paths and one or more of the expressions in the loop are replaced with the shortest path expressions.

15 Claims, 5 Drawing Sheets

```
a = 10
do i = 1, n
   b = a * i
   c = a * i+1
   d = a * i + e * f
   e = a * i + e * f + 1
   f = ...
enddo
```

*Fig. 3*

```
                                    cost
item 0: a * i                          3
item 1: a * i+1                        4
item 2: a * i + e * f                  7
item 3: a * i + e * f + 1              8
```

|   | x-axis | | | |
|---|---|---|---|---|
| y-axis | 0 | 1 | 2 | 3 |
| 0 | -1 | 1 | 3 | 4 |
| 1 | 2 | -1 | 4 | 3 |
| 2 | 4 | 4 | -1 | 1 |
| 3 | 5 | 5 | 2 | -1 |

SCALAR CODE REDUCTION USING SHORTEST PATH ROUTING

TECHNICAL FIELD

This patent document pertains generally to vectorizing compilers, and more particularly, but not by way of limitation, to a system and method for reducing the number of scalar instructions that are required in order to produce the required results in a given loop.

BACKGROUND

A problem in vectorizing compilers is that it can be difficult to reduce the total number of scalar instructions that are required in order to produce the required results in a given loop. This problem is often thought of as two problems, reducing addressing calculations and reducing scalar instructions. However, typical vector compilers do not make this distinction.

A classic example of a type of code which benefits greatly from this algorithm is a stencil code. That is a code which uses several elements which are constant steps away from a central element, i.e. elements A[i][j][k], A[i][j][k+1], A[i][j][k−1], A[i][j+1][k], A[i][j−1][k], A[i][j+1][k+1], . . . are all used in the same loop.

Historically the scalar instruction count in a loop has been reduced by hoisting loop invariants and identifying common subexpressions. Hoisting invariants is a well understood, mature technology; identifying common subexpressions is, however, an expensive process that many compilers fail to do well, due to the computational complexity of the problem.

What is needed is a compiler system and method for reducing the number of scalar instructions that are required in order to produce the required results in a given loop.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 3 illustrates an example code loop body;

FIG. 4 illustrates an expression list;

DETAILED DESCRIPTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As noted above, a problem in vectorizing compilers is that it can be difficult to reduce the total number of scalar instructions that are required in order to produce the required results in a given loop. This problem is often thought of as two problems, reducing addressing calculations and reducing scalar instructions. However, typical vector compilers do not make this distinction.

A classic example of a type of code which benefits greatly from this algorithm is a stencil code. That is a code which uses several elements which are constant steps away from a central element, i.e. elements A[i][j][k], A[i][j][k+1], A[i][j][k−1], A[i][j+1][k], A[i][j−1][k], A[i][j+1][k+1], . . . are all used in the same loop.

Historically the scalar instruction count in a loop has been reduced by hoisting loop invariants and identifying common subexpressions. Hoisting invariants is a well understood, mature technology; identifying common subexpressions is, however, an expensive process that many compilers fail to do well, due to the computational complexity of the problem. Identifying expressions that share a common root can be simplified when the expressions have already been processed as strength reduction candidates. That is when the compiler has already discovered that an expression contains the loop induction variable. By reducing the search space to this set of expressions the problem space is sufficiently reduced to allow for an elegant solution.

Figure 1:
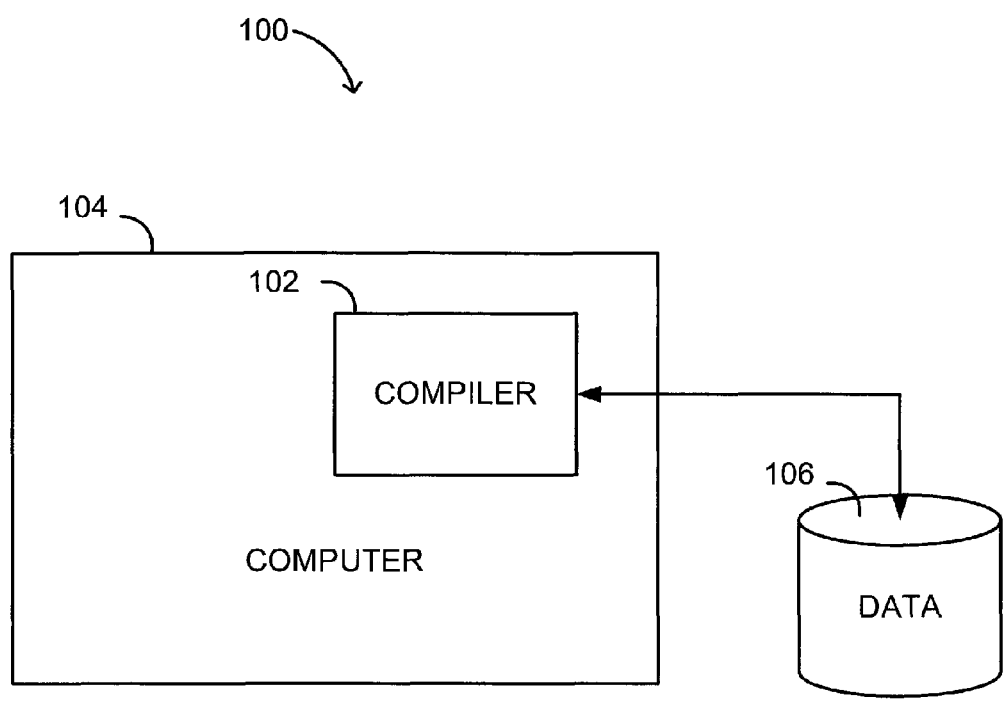
FIG. 1 illustrates a computer system having a compiler.

A computer system 100 is shown in FIG. 1. In the computer system of FIG. 1, a compiler 102 running on computer 104 accesses source code stored in data storage 106, compiles the source code into object code that is executable on a vector computer and stores the compiled code in data storage 106.

In one embodiment, compiler 102 reduces the number of scalar operations that must be calculated inside of a loop while improving the compiler's ability to reduce redundant work via strength reduction and invariant hoisting. The algorithm is generally applicable to any basic block where expressions have an inherent inter-relationship.

Strength reduction is a compiler optimization where a function of some systematically changing variable is calculated more efficiently by using previous values of the function.

Invariant hoisting moves expressions which are computed with in a loop but do not change between iterations of the loop above the loop so that the expression is computed once, before the loop is entered, and the resulting value is used inside the loop.

In one embodiment, compiler 102 includes a mechanism for finding shortest path routes through a set of expressions that are known to have a common relationship. Compiler 102 also uses a pruning routine to reduce the number of expressions is a set. Such an approach provides for a tractable algorithm. In addition, the use of the shortest path routine provides a mechanism for discovering common subexpressions.

Figure 2:
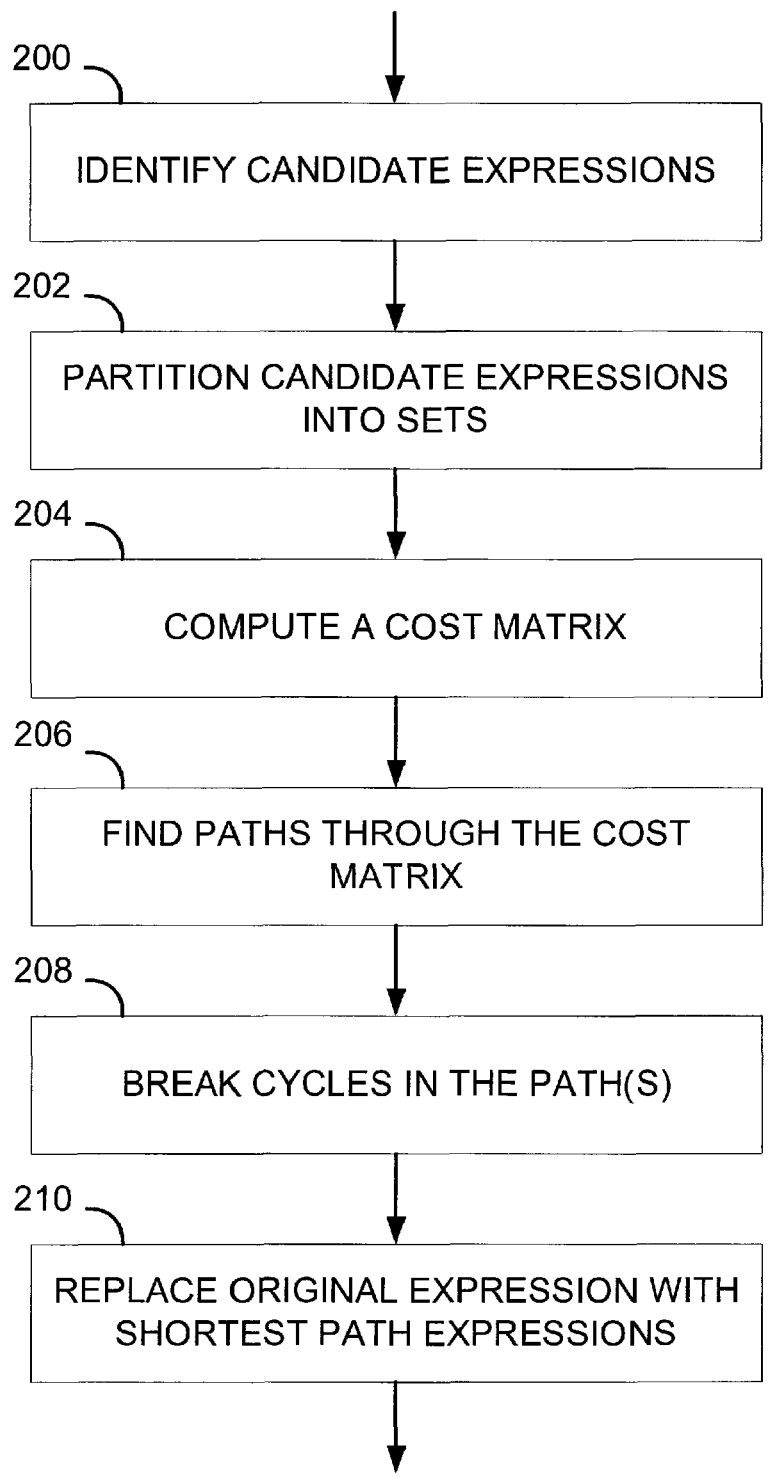
FIG. 2 illustrates a method of reducing scalar instructions within a loop.

A method of computing the shortest path expression reductions is shown in FIG. 2. In the example shown in FIG. 2, the shortest path expression reductions:

1) At 200, identify candidate expressions in basic block, loop invariant or loop induction expressions;
2) At 202, look for sets of expressions that involve the same induction variable, object base and offset;
3) At 204, compute cost matrix for members of each set containing more than one member;
4) At 206, find initializer path through map for the set;
5) At 208, break cycles in path; and
6) At 210, replace expressions with new less computationally expensive expression chains.

The first step in this algorithm is to identify, at 200, a set of expressions in a candidate region for examination. Taking the example code 300 in FIG. 3, we can find four candidate expressions. These expressions are collected into a set or list 400 numbered from zero to three in FIG. 4. The numeric label on these expressions is used to identify the expressions in several derived tables and will not be explicitly called out again.

At 202, the algorithm partitions the expressions found in the first step into sets which involve a particular induction variable, object base and offset (as shown in FIG. 4). Thus all of the items in a set will share sufficient subexpressions to ensure that taking the difference of one item from another will have a logical meaning. As a counter example consider the expressions a*i and b*j these two expressions share no logical relation and therefore would not be grouped into the same set.

Figures 5, 6:
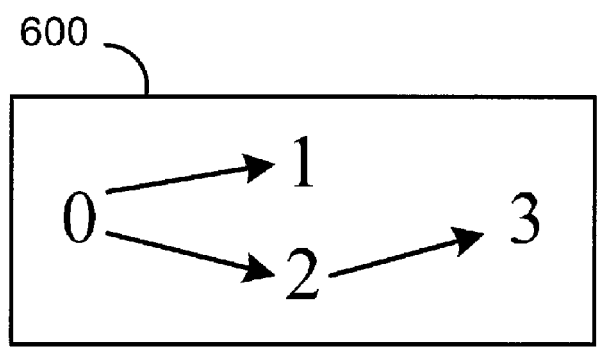
FIG. 5 illustrates a computed cost matrix for the example code.
FIG. 6 illustrates shortest path routing.

At 204, the algorithm computes a cost matrix 500 by subtracting all of the expressions from all of the other expressions in the set. The item number of the expression subtracted is used on the y axis and the item number of the base expression is used on the x-axis to build the matrix present in FIG. 5. The pruning done at 202 makes such an approach palatable; in implementations where the number of expressions in the sets has not been pruned in the manner shown above, the calculation of a cost matrix can be cost prohibitive.

At 206, compiler 202 finds a path 600, or set of paths 600, that the cost matrix which produces the lowest cost to each expression. For the example this means running a shortest path routing algorithm which returns the path in FIG. 6. Comparing the cost of following this path to the original cost of computing the expressions shows a significant improvement. The cost of computing the initial expressions, see FIG. 4, is 22, where as the cost of computing the expressions in the path is 8. This is a 2.75× reduction in the number of expressions that need to be computed to get the same results.

At 208, the algorithm simply breaks loops that may exist in a route. Loops may occur if the shortest path routing algorithm does not ensure a tree structure to the routes discovered.

Figure 7:
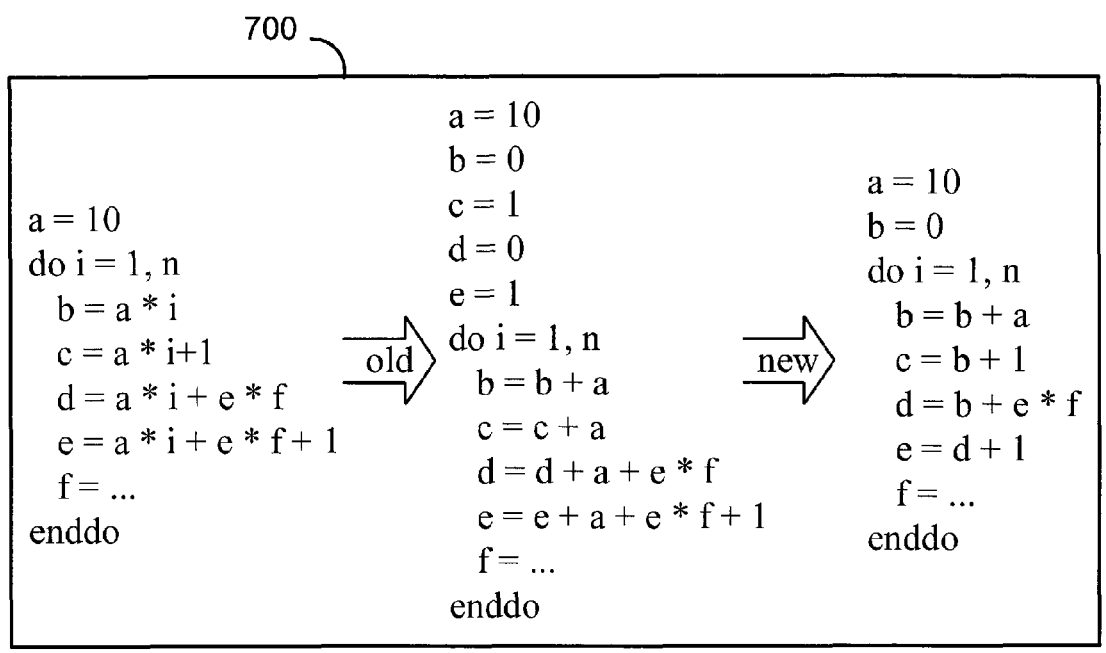
FIG. 7 illustrates replacing expressions in the original code with shortest path expressions.

At 210, the algorithm replaces the expressions in the original code with the new shortest path expressions. FIG. 7 provides an example of what a typical strength reduction system 700 would do to the example code, old, and then shows the resulting code using the algorithm presented here. Moving from left to right, the first bit of code is the same code fragment as presented in FIG. 3, moving to the right the example shows what the code would look like if strength reduction were run on the example code. The interesting points here are that there are four new initializer expressions before the do-loop. This is a common problem with strength reduction as the number of strength reduced expressions often determines the number of required initial values. Moving even further to the right is the resulting code after the algorithm presented here has replaced the expressions according to the shortest path map. Notice that there is only one additional initializer over the starting example code, which means there are three more registers which do not have to hold values across iterations of the loop freeing them for other uses without requiring spills. Potentially even more important than the register savings is the reduction in the number of computations required inside the do-loop to arrive at the answers.

In conclusion, compiler 102 includes a mechanism for finding shortest path routes through a set of expressions that are known to have a common relationship. Compiler 102 also uses a pruning routine to reduce the number of expressions is a set. Such an approach provides for a tractable algorithm. In addition, the use of the shortest path routine provides a mechanism for discovering common subexpressions.

The above approach combines strength reduction with common sub-expression elimination, avoids the high cost of looking for relationships in expressions that may not have a relationship; and uses shortest path routing to sort the expressions into the lowest costs computation. This approach provides a tractable solution to a very expensive general purpose algorithm.

This approach reduces scalar computation (which in turn means reduced addressing computation) while using a shortest path routing mechanism to avoid cost of all-to-all pruning commutation. Finally, its reduced search space means faster computation.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R.§1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

What is claimed is:

1. In a compiler, a method of computing a shortest path expression in a loop having a plurality of expressions, comprising:
    identifying candidate expressions from the plurality of loop expressions;
    partitioning candidate expressions into sets, including a first set;
    computing a cost matrix as a function of the sets of the candidate expressions, the cost matrix indicating cost of generating each candidate expression from other candidate expressions and having a row for each candidate expression and a column for each candidate expression;
    finding one or more paths through the cost matrix;
    detecting cycles in the paths;
    if there are cycles in the paths, breaking the cycles;
    generating one or more shortest path expressions as a function of the paths; and
    replacing one or more of the expressions in the loop with the shortest path expressions.

2. The method of claim 1, wherein the sets involve a particular induction variable, object base and offset.

3. The method of claim 1, wherein computing a cost matrix includes subtracting each of the expressions within the first set from all of the other expressions in the first set.

4. The method of claim 3, wherein finding one or more paths includes selecting paths through the cost matrix which produce the lowest cost for each expression.

5. The method of claim 1, wherein finding one or more paths includes selecting paths through the cost matrix which produce the lowest cost for each expression.

6. A computer, comprising:
a processor;
a data source; and
a compiler executing within the computer, wherein the compiler reads source code from the data source, wherein the source code includes a loop having a plurality of expressions, wherein the compiler identifies candidate expressions from the plurality of loop expressions, partitions candidate expressions into sets, computes a cost matrix as a function of the sets of the candidate expressions, the cost matrix indicating cost of generating each candidate expression from other candidate expressions, finds paths through the cost matrix, detects cycles in the paths, breaks any cycles, generates one or more shortest path expressions as a function of the paths, and replaces one or more of the expressions in the loop with the shortest path expressions.

7. The method of claim 6, wherein the sets involve a particular induction variable, object base and offset.

8. The method of claim 6, wherein the sets include a first set and wherein the compiler computes a cost matrix by subtracting each of the expressions within the first set from all of the other expressions in the first set.

9. The method of claim 6, wherein the compiler selects paths through the cost matrix which produce the lowest cost for each expression.

10. A data storage storing computer-executable instructions for controlling a computer to generate reduced expressions for a loop having a plurality of expressions, by a method comprising:

identifying candidate expressions from the plurality of loop expressions;

generating a cost matrix indicating a cost of generating each candidate expression from each other candidate expression;

identifying paths through the cost matrix that do not have cycles, each path having a cost;

selecting an identified path based on the cost of the identified paths;

generating shortest path expressions based on the selected path; and replacing expressions in the loop with the shortest path expressions.

11. The data storage of claim 10 wherein the identifying of paths includes finding a path that has a cycle and breaking the cycle of the path.

12. The data storage of claim 10 wherein the cost of generating each candidate expression from each other candidate expression is based on a subtraction of the candidate expressions.

13. The data storage of claim 10 wherein the selecting of the identified path selects a plurality of identified paths and wherein the generating of the shortest path expressions is based on the plurality of selected paths.

14. The data storage of claim 10 wherein the selecting of the identified path selects the path with the lowest cost.

15. The data storage of claim 10 including adding an initializer before the loop with the replaced expressions.

* * * * *

UNITED STATES PATENT AND TRADEMARK OFFICE
CERTIFICATE OF CORRECTION

| | | |
|---|---|---|
| PATENT NO. | : 8,413,126 B2 | |
| APPLICATION NO. | : 11/763990 | |
| DATED | : April 2, 2013 | |
| INVENTOR(S) | : James C. Beyer | |

It is certified that error appears in the above-identified patent and that said Letters Patent is hereby corrected as shown below:

In the Specifications:

In column 3, line 25, delete "that" and insert -- thru --, therefor.

Signed and Sealed this
Second Day of July, 2013

Teresa Stanek Rea
*Acting Director of the United States Patent and Trademark Office*